US006487262B1

(12) United States Patent
Moulton et al.

(10) Patent No.: US 6,487,262 B1
(45) Date of Patent: *Nov. 26, 2002

(54) SYNCHRONIZATION AND DOWNCONVERSION IN TDM/TDMA SYSTEMS

(75) Inventors: Grant E. Moulton, Santa Rosa; Eric J. Rossin, Sebastopol, both of CA (US)

(73) Assignee: Next Level Communications, Rohnert Park, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/794,791

(22) Filed: Feb. 4, 1997

Related U.S. Application Data

(60) Provisional application No. 60/011,244, filed on Feb. 6, 1996, and provisional application No. 60/028,326, filed on Oct. 11, 1996.

(51) Int. Cl.[7] .................................................. H04L 7/00
(52) U.S. Cl. ........................ 375/356; 375/358; 375/373
(58) Field of Search ................................ 375/376, 373, 375/371, 354, 355, 327, 356, 362, 358; 348/12, 6, 13; 455/5.1, 3.1, 6.3; 341/61; 370/516, 503, 517, 481, 487, 486, 485, 480; 327/141; 331/1 A; 359/135, 115

(56) References Cited

U.S. PATENT DOCUMENTS

| 5,422,909 A | 6/1995 | Love et al. ................. 375/200 |
| 5,454,007 A | 9/1995 | Dutta .......................... 375/322 |
| 5,521,938 A | 5/1996 | Stewart et al. .............. 375/206 |
| 5,570,347 A | * 10/1996 | Bestler et al. ................. 370/17 |
| 5,572,347 A | * 11/1996 | Burton ........................ 359/124 |
| 5,594,726 A | * 1/1997 | Thompson et al. .......... 370/485 |

OTHER PUBLICATIONS

J. Lodge and V. Szwarc, "The Digital Implementation of Radio," *Proceedings of Globecom '92* vol. 1, pp. 462–466 (Orlando, Fl, Dec, 1992).
S. Dutta and S. Henely, "Low Cost Coherent Demodulation for Mobile Satellite Terminals," *Porceedings of the Third International Mobile Satellite Conference '93*, JPL: Publ. 93–009, pp. 393–398 (Pasadena, CA, Jun. 1993).
A. Brown and W. Sward, "Digital Downconversion Test Results with a Broadband L–Band GPS Receiver," *Proceedings of the 13th Digital Avionics Systems Conference*, pp. 426–431 (Phoeniz, AZ, Oct. 1994).
L. P. Sabel and D. Tran, "An Analysis of IF Filter Effects in Bandpass Sampling Digital Demodulation," *Proceedings of 6th International Conference on Radio Receivers and Associated Systems*, pp. 57–61 (Bath, UK, Sep. 1995).

* cited by examiner

*Primary Examiner*—William Luther
(74) *Attorney, Agent, or Firm*—IP Strategies, P.C.

(57) ABSTRACT

In a fiber-to-the-curb telecommunications system a method of network synchronization is presented in which data is transmitted from a broadband network unit to devices in a residence on a downstream carrier frequency, where the downstream data rate and the downstream carrier frequency are integer multiples of a sub-harmonic of a master clock. In the upstream direction, where data is transmitted from the devices to the broadband network unit, upstream data is transmitted on an upstream carrier frequency and the upstream data rate and upstream carrier frequency are integer multiples of a sub-harmonic of a master clock. Digital downconversion is performed on the data received at the broadband network unit to produce baseband samples.

9 Claims, 6 Drawing Sheets

SYNCHRONIZATION AND DOWNCONVERSION IN TDM/TDMA SYSTEMS

CROSS-REFERENCES

This application claims the benefit of U.S. Provisional Application No. 60/011,244 filed on Feb. 6, 1996, entitled "Synchronization in TDM/TDMA System," of which Grant E. Moulton is the inventor, and U.S. Provisional Application No. 60/028,326 filed on Oct. 11, 1996, entitled "Synchronization and Downconversion in TDM/TDMA Systems," of which Grant E. Moulton and Eric J. Rossin are the inventors.

All of the aforementioned applications are incorporated herein by this reference, but are not admitted to be prior art.

FIELD OF THE INVENTION

The present invention relates to a method and apparatus for the synchronization of the data in a telecommunications system and downconversion of data modulated onto a radio frequency carrier.

BACKGROUND OF THE INVENTION

In the area of telecommunications, there have been advances in Fiber-to-the-Curb (FTTC) technology in which devices in the home are connected to the telephone central office via a network of one or more optical fibers connecting the central office to network points called Broadband Network Units (BNUs) which in turn connect to the subscriber home via a coaxial cable, and to the devices in the home via a passive splitter and in-home coaxial wiring. In these FTTC networks, signals can be routed to the home via a single coaxial cable connecting the home to the BNU.

Using the FTTC configuration with a coaxial drop cable, devices in the home including telephones, computers and televisions will be connected to the coaxial network. Because there are multiple devices in the home which will all transmit back to a central receiver, and because telecommunications services require accurate clocks for data recovery and transmission, it is important to have a method of synchronization which allows the devices in the home to recover an accurate system clock, and to transmit and receive on the correct frequencies and at the correct data rates.

In addition to the above mentioned problem, there are multiple devices in the home which are connected to the BNU on a single coaxial cable, a multiple access protocol such as Time Division Multiple Access, Code Division Multiple Access, or Frequency Division Multiple Access is used to access the BNU from the devices in the homes. These multiple access protocols typically require an accurate bit clock as well as an accurate carrier frequency.

When data is received at the BNU, it is necessary to process the signal, which is typically a radio frequency signal, and recover the information transmitted from the devices. A first step in recovering the information is downconversion, in which the radio frequency signal is shifted in frequency to a baseband signal. This process can be complex and can require an excessive amount of signal processing power due to the high data rates and the high speed sampling required to digitize the radio frequency signal.

Another difficulty which is encountered in such a system is the fact that other services such as traditional cable TV may be provided on the same coaxial drop cable, and thus it is important to select frequencies for both downstream (BNU-device) and upstream (device-BNU) transmission which do not interfere with the cable TV services which are typically in the 50–550 MHz frequency range.

For the aforementioned reasons there is a need for an accurate, low cost method of synchronization in a FTTC system which employs a coaxial drop to the home, and to select frequencies for downstream and upstream transmission which permit use of the coaxial cable for the transport of other services at other frequencies. It is also necessary to have an efficient method of downconversion.

SUMMARY OF THE INVENTION

In a FTTC system transmission of downstream data from a BNU to devices in a residence is accomplished by transmitting downstream data on a downstream radio frequency (RF) carrier in which both the downstream data rate and downstream RF carrier are integer multiples of a subharmonic of a master clock.

Data from devices in the residence is transmitted to the BNU on an upstream RF carrier, and both the upstream RF carrier and upstream data rate are integer multiples of a sub-harmonic of a master clock.

In one embodiment, a 155.52 Mb/s data signal is received at the BNU over an optical fiber and within the BIU (in the BNU) the clock recovered from this signal serves as a reference clock, from which a 19.44 MHz clock (⅛ of the 155 Mb/s clock signal) is produced. A local oscillator at 622.08 MHz is locked to the 19.44 MHz clock. The 622.08 MHz clock serves as a carrier for the downstream data, which has a data rate of 51.84 Mb/s. A 51.84 MHz clock can be easily derived from the 155.52 MHz clock. A 38.88 MHz receive clock is also generated at the BIU, based on locking to the 19.44 MHz clock.

At the NIM (in the device in the home) the 622.08 MHz carrier is recovered, as is the 51.84 MHz bit clock. Because these two signals are synchronous, a number of methods can be used to derive them. A 19.44 MHz clock, 77.76 MHz clock, and 38.88 MHz clock can all be readily generated, since the system is synchronous and all of the frequencies are harmonically related. Upstream transmission to the BIU can take place at a carrier frequency of 38.88 MHz, with a data rate of 19.44 Mb/s.

In an alternate embodiment, the downstream transmission takes place at a carrier frequency of 19.44 MHz, with a data rate of 51.84 Mb/s. This embodiment has the advantage of not disrupting the spectrum above 550 MHz, thus leaving all of that spectrum available for cable TV or other applications.

A method of digital downconversion is used for reception of upstream data in the BNU in which a baseband signal is generated by a downconversion process in which the first step is sampling of the RF passband signal at a rate which is equal to 4/3 the upstream carrier frequency. Subsequent to this sampling, a baseband signal is generated by multiplication of the sampled bandpass signal by $e^{-nj\pi/2}$, where n represents a discrete time variable. The complex baseband signal is separated into a real and imaginary part to create the I and Q channels. The resulting baseband signals, one for the I channel and one for the Q channel, are interpolated to produce three output samples for every input sample. Low pass filtering is performed on the interpolated signals, and the resulting filtered baseband signals are decimated by eight to produce one output sample for every eight input samples.

An advantage of the present invention is that a minimum of phase-locked-loops are required, and that downconversion can be accomplished in a cost effective manner on a silicon integrated circuit, since many of the multiply operations in the digital signal processing steps can be eliminated.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION OF THE PREFERRED EMBODIMENT

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

Figure 1:
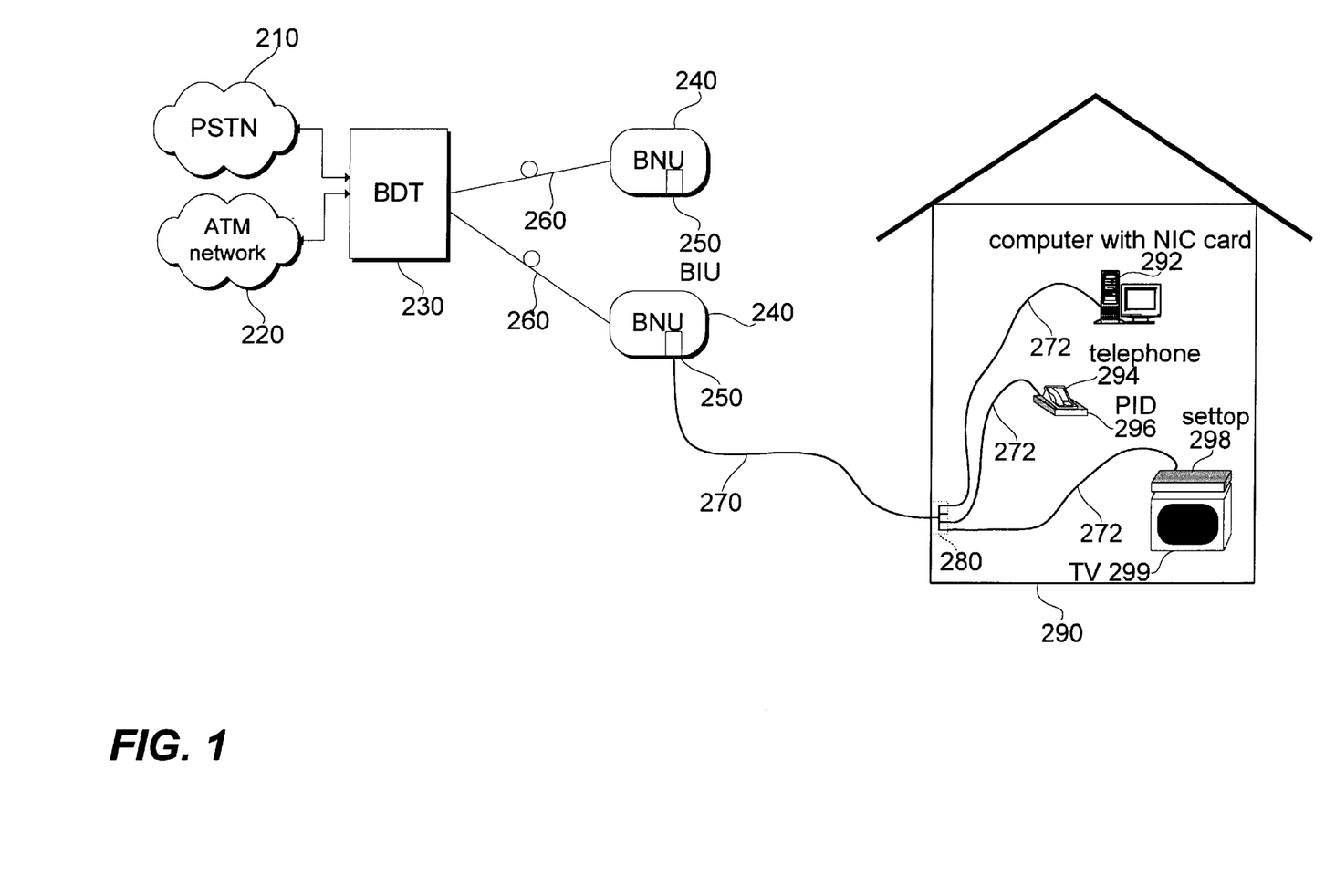
FIG. 1 shows a Fiber-to-the-Curb (FTTC) network with a point-to-multipoint coaxial network connecting the Broadband Network Unit (BNU) with devices in the home.

In the FTTC system illustrated in FIG. 1, a Broadband Digital Terminal (BDT) 230, typically located in a telephone central office, receives signals from a Public Switched Telephone Network (PSTN) 210 and an ATM network 220. Signals are transmitted via an optical fiber 260 to Broadband Network Units (BNUs) 240, typically located within 500 ft. of the subscribers' residences 290. In a preferred embodiment a BNU serves 8 residences 290. In an alternate embodiment, a BNU is used to serve 16 residences 290. In a preferred embodiment, 64 BNUs are connected to a BDT 230.

The BNU 240 contains a Broadband Interface Unit (BIU) 250 which is a transceiver for signals on a subscriber network. In a preferred embodiment BIU 250 connects to devices in the residence 290 via a subscriber coaxial cable network which is comprised of a coaxial drop cable 270, a passive splitter 280, and in-home coaxial wiring 272. The subscriber coaxial cable network forms a shared media because various devices in the residence 290 communicate with the BIU 250 over the subscriber coaxial cable network. In a preferred embodiment each BIU 250 has connections for two subscriber coaxial cable networks, and four BIUs 250 are used to serve 8 residences 290.

In an alternate embodiment, twisted copper pair cables are used to form a twisted pair network connecting the BNU 240 to the residence 290. In this embodiment, the BIU 250 transmits and receives a high-speed digital signal over the twisted pair. When used herein the term subscriber network refers in general to the connection between the BNU 240 and the devices in the residence 290.

In residence 290, various devices are used for communications services transported over the FTTC system. These devices include telephone 294 which is connected to the FTTC network via a Premises Interface Device (PID) 296 which receives the signal from the coaxial cable and generates a telephone interface as specified in Part 68 of the FCC rules. A television 299 is connected to the network via a television set-top 298. A computer with a Network Interface Card (NIC) 292 can receive and send data over the FTTC network.

In the FTTC system digital signals are used to carry voice, video, and data signals to the devices. Asynchronous Transfer Mode (ATM) protocols and formats can be used to carry the signals. The system requires bi-directional communications between the devices in the residence 290 and the BNU 240, and information is transmitted in the return direction, for example, from the devices to the BNU 240 for changing channels on the television 299, carrying out voice conversations on the telephone 294, or using network services on the computer with NIC card 292. The system provides for the transport of ATM cells in the return direction as well as the forward (BNU to devices) direction.

Because the system is synchronous, it is necessary to create clocks for services which are not synchronous with the aforementioned clocks. This can be easily accomplished using the techniques developed for synchronous digital transmission, which include the use of pointers and floating payloads which provide for the transport of non-synchronous signals in a synchronous transport system.

A shared media is formed by the subscriber coaxial network and devices connected to the subscriber coaxial network use a multiple access protocol to transmit to the BIU 250 in the BNU 240. A number of multiple access protocols can be used including Frequency Division Multiple Access (FDMA), Code Division Multiple Access (CDMA) and Time Division Multiple Access (TDMA). When a TDMA protocol is used the devices will be assigned opportunities for the transmissions to the BIU 250, and, when ATM protocols are used, will transmit one or more cells in the opportunities. The TDMA protocol requires the receiver in the BIU 250 to be of the burst mode type, which can receive the bursts transmitted by the devices in residence 290.

In all embodiments, a number of modulation and multiple access techniques can be utilized. Typically, 16QAM modulation will be used for the downstream signal, while burst mode QPSK and a Time Division Multiple Access technique will be used for the upstream transmission.

Although signals can be transmitted on the subscriber coaxial cable network in baseband form when the splitter 280 has the appropriate low frequency characteristics, it is generally more appropriate to transmit signals in both the forward and return direction on passband signals which are centered about some non-zero frequency.

Figure 2:
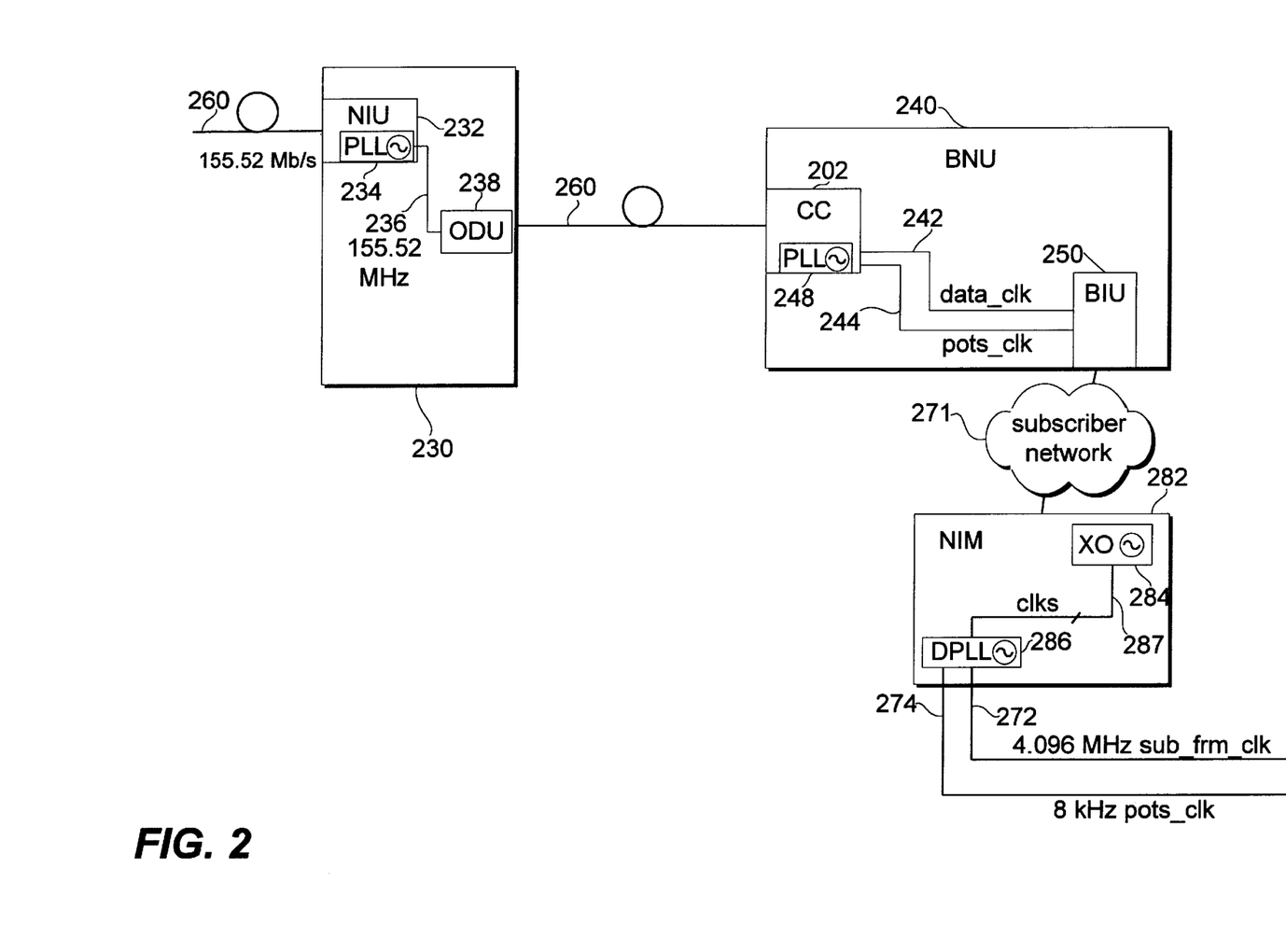
FIG. 2 illustrates synchronization within a FTTC system.

An embodiment for synchronization in a FTTC system is illustrated in FIG. 2. At the BDT 230, a 155.52 Mb/s signal is received on optical fiber 260. The signal is received by Network Interface Unit (NIU) 232 which contains a Phase Locked Loop (PLL) 234. The PLL 234 recovers, in conjunction with other circuitry within NIU 232, a 155.52 MHz clock 236. The 155.52 MHz clock 236 is transmitted to an Optical Distribution Unit (ODU) 238 which transmits data to, and receives data from BNU 240 via an optical fiber 260.

Within the BNU 240 a Common Control (CC) card 202 receives the optical signal, and a PLL 248 on the Common Control card 202 recovers the 155.52 MHz clock. In a preferred embodiment, a 19.44 MHz clock signal 242 and a 8 kHz POTs clock signal 244 are derived and transmitted to a Broadband Interface Unit 250.

The BIU 250 transmits and receives data over coaxial cable 270 which is connected to Network Interface Module (NIM) 282. NIM 282 is part of one of the in-home devices including the PID 294, television set-top 298, and computer with NIC card 292. The NIM is connected to the BIU 250 via the subscriber network 271. In a preferred embodiment the subscriber network 271 includes the coaxial cable 270, splitter 280 and in-home coaxial cable 272. In an alternate embodiment the NIM 282 is directly connected to coaxial cable 270. In yet another embodiment, the subscriber network 271 is a twisted pair drop cable connected to one or more devices in the residence 290. The NIM 282 receives downstream signals, and has a local crystal oscillator 284 which generates clocks 287. A Digital Phase Locked Loop (DPLL) 286 is used, in conjunction with the received data, to generate a 4.096 MHz subscriber frame clock signal 272 and a NIM 8 kHz POTs clock signal 274.

In the upstream direction the NIM transmits data at a rate of 19.44 Mb/s to BIU 250 on a carrier frequency of 38.88 MHz. In a preferred embodiment this carrier frequency and the data clock are not phase locked to any downstream signal.

Figure 3A:
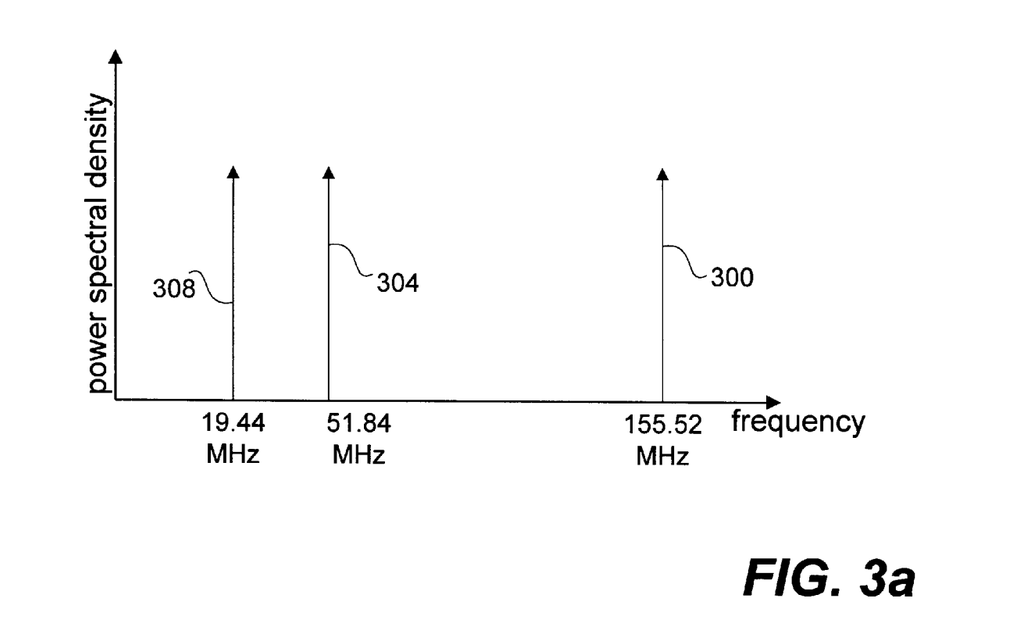
FIG. 3 illustrates a frequency plan for a FTTC system.

FIG. 3a illustrates the clocks which are generated at the BNU 240 which include a synchronous 155.52 MHz clock, a downstream data clock 304 and a synchronous 19.44 MHz clock 308. As used herein, synchronous refers to a clock which is derived from a master clock, and is phase locked, tracking the phase and frequency of the master clock. Deriving a clock signal, as used herein, refers to phase locking a lock clock to an incoming clock. Methods for phase locking are well known to those skilled in the art.

Figure 3B:
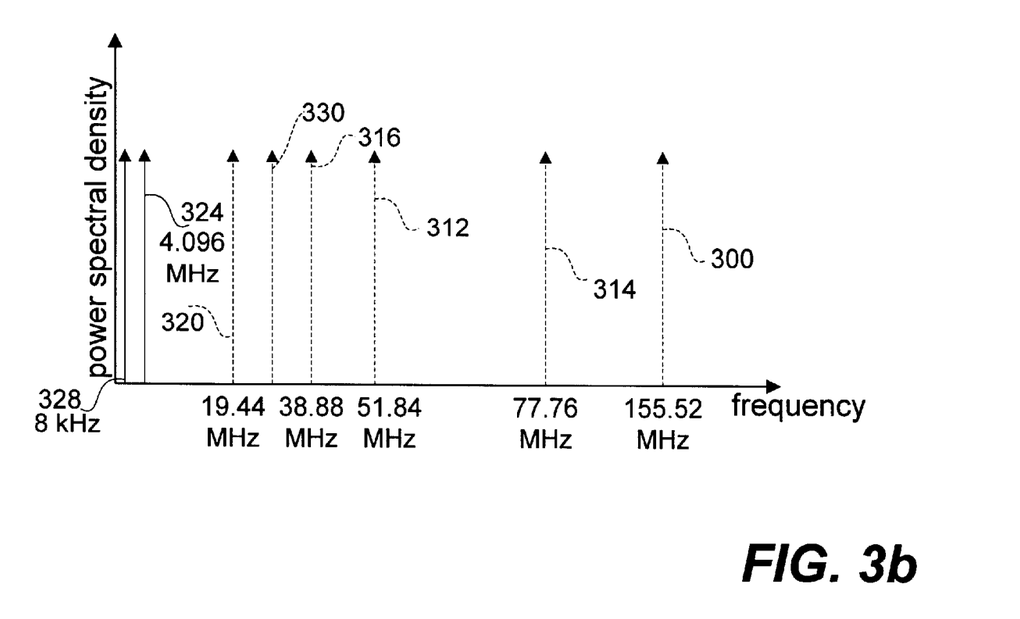

FIG. 3b illustrates the clocks which are generated at the NIM 282 and include a 19.44 MHz clock 320, a 38.88 MHz clock 330, a 51.84 MHz clock 312 and a 77.76 MHz clock 314, and a 155.52 MHz clock 300. In a preferred embodiment 25.92 MHz, 9.72 MHz, and 6.48 MHz clocks, as well as a 7.776 MHz processor clocks are also generated. When used herein, the term generated refers to a clock signal which is not necessarily phase locked to another clock signal.

Transmission of data from BIU 250 to NIM 282 takes place by modulating downstream data onto an RF carrier. Both the carrier and downstream data clock are integer multiples of a sub-harmonic of a master clock at BIU 250. In a preferred embodiment, the master clock at BIU 250 is synchronous 19.44 MHz clock 308, the downstream data clock is 51.84 MHz clock 304, and the downstream carrier is a 19.44 MHz signal generated from 19.44 MHz clock 308.

Other clocks which are integer multiples of subharmonics of the master clock are generated in BIU 250 and used for analog to digital (A/D) and digital to analog (D/A) conversions. In a preferred embodiment, A/D conversion of the signal received at BIU 250 takes place at 51.84 Megasamples per second (Msps) and digital to analog conversion for transmission of data takes places at 77.76 Msps.

Data is received over the subscriber network 271 at NIM 282, and is digitally sampled. In a preferred embodiment, the sampling of the received downstream data takes place at a rate of 77.76 Msps. Digital $f_s/4$ downconversion is used subsequently to produce baseband signals. In an alternate embodiment, an analog downconversion is used based on a 38.88 MHz signal for generation of I and Q baseband signals, and the baseband signals are sampled at 25.92 Msps. Further digital processing is performed on the received data using multiples of a sub-harmonic of 19.44 MHz clock 320.

In a preferred embodiment, transmission of data from NIM 282 to BIU 240 takes place on a carrier frequency of 38.88 MHz, at a data rate of 19.44 MHz. Integer subharmonics of 19.44 MHz clock 320 are used to generate both the carrier frequency and data clock for upstream data transmission. Analog or digital techniques can be used to generate these clocks.

In a preferred embodiment processing of data for upstream transmission from NIM 282 takes place using digital to analog conversion a rate of 155.52 MHz, using $f_s/4$ upconversion to arrive at a carrier frequency of 38.88 MHz. In an alternate embodiment, I and Q baseband signals are constructed using D/A converters operating at a 19.44 Msps conversion rate using 19.44 MHz clock 320. The baseband signals are upconverted using 77.76 MHz clock 314.

The clocks at BIU 250 and the NIM 282 are not restricted to the aforementioned clocks. Other clocks can be used for internal operations such as D/A and A/D conversions, as well as for establishing the data rate or carrier frequencies. In a preferred embodiment, 19.44 MHz clock 320 is not phase locked to 19.44 MHz master clock 308. In an alternate embodiment, the 19.44 MHz clock 320 at NIM 282 is phase locked to 19.44 MHz clock 320 using phase locking techniques known to those skilled in the art. The advantage of phase-locking 19.44 MHz clock 320 at the NIM 282 is that it reduces the frequency uncertainty of bursts of data arriving at BIU 250, and enables longer bursts to be recovered successfully.

Figure 4:
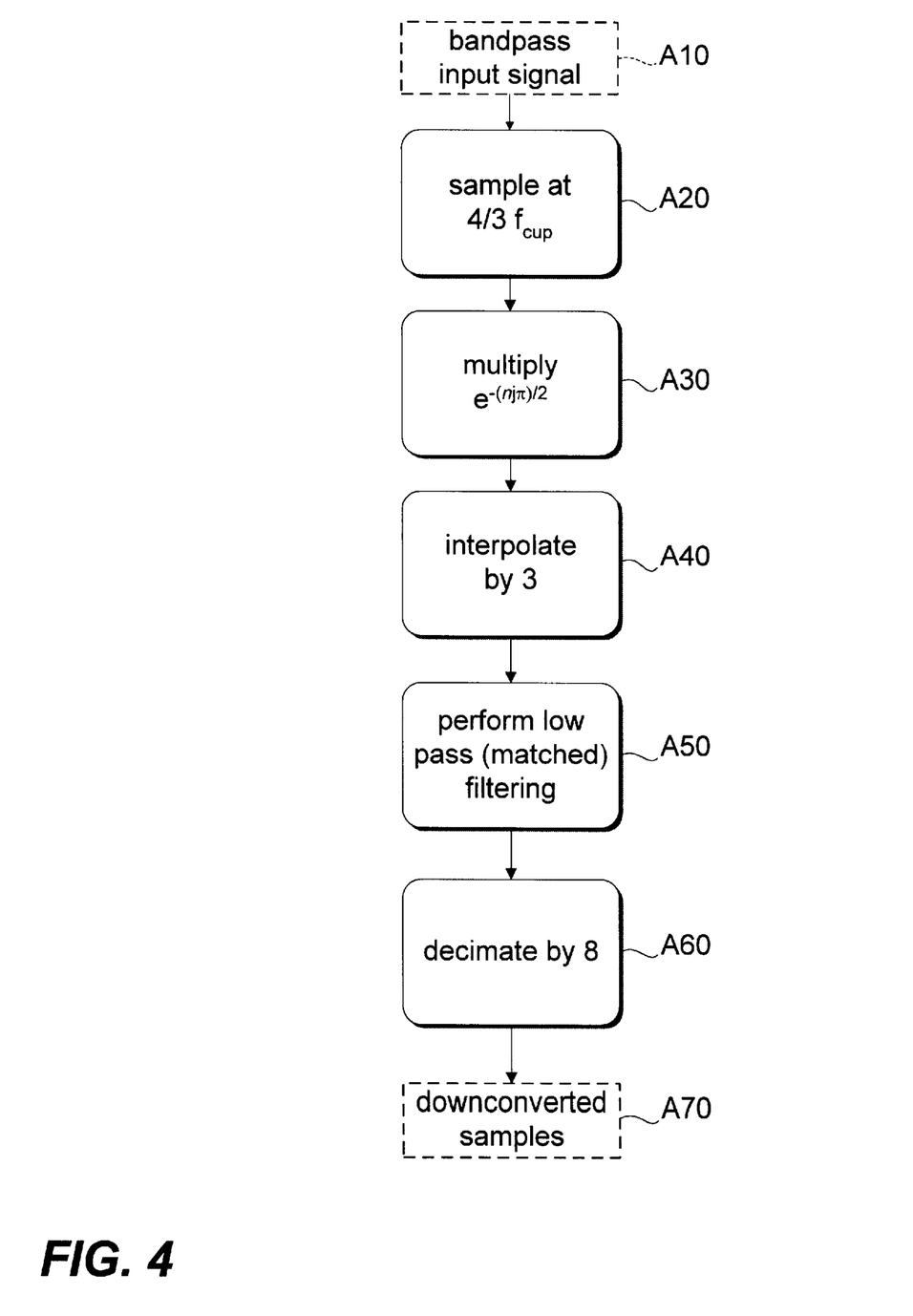
FIG. 4 illustrates the steps for downconversion.

A method for the downconversion of upstream burst data received at BIU 250 is illustrated in FIG. 4. Referring to FIG. 4, the bandpass input signal A10 is sampled at $4/3\ f_{cup}$ in step A20, where $f_{cup}$ is the upstream carrier frequency. This technique is referred to herein as $f_s/4$ downconversion, since after such sampling the inverted spectrum is now at $f_s/4$. This technique can be used as long as the band below $f_s/2$ remains clear before sampling The real sampled signal is multiplied by $e^{-(nj\pi/2)}$ A30 which generates complex baseband samples. This signal is interpolated in step A40 to generate 3 output samples for every input sample. In an interpolation step A40 two zeros are added between the data samples. Interpolation when use herein means the addition of zeros for subsequent filtering.

Step A40 results in I and Q data streams, each at 155.52 (Msps), which are low pass filtered A50. In a preferred embodiment this is a root-raised cosine low pass filter with an excess bandwidth of 35% ($\alpha$=0.35). The signal is decimated by eight A60 to produce downconverted samples A70 at a rate of 19.44 Msps.

Figure 5:
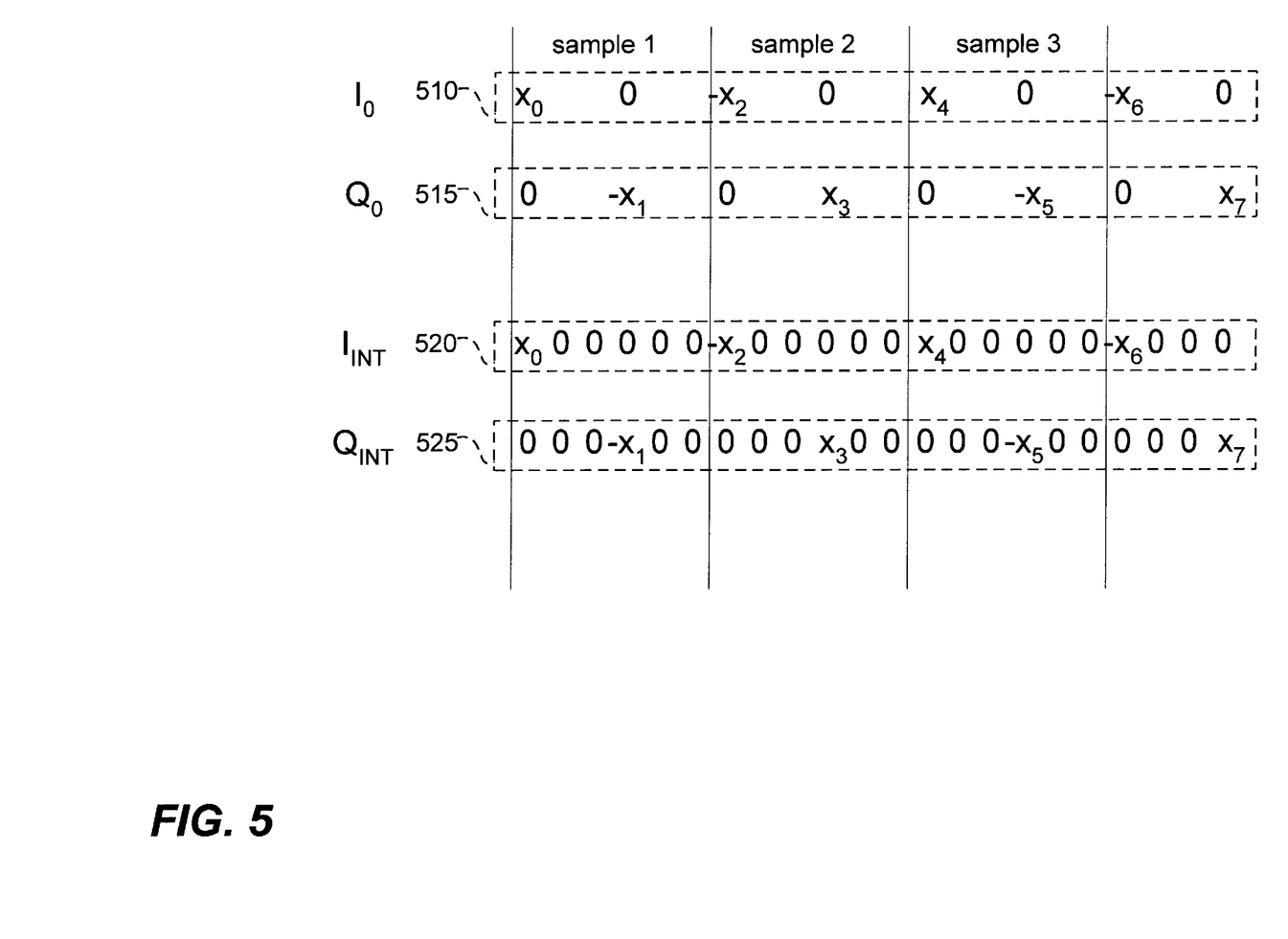
FIG. 5 illustrates the I and Q data streams prior to and after interpolation.

FIG. 5 illustrates the I channel before interpolation, $I_0$ 510; the Q channel before interpolation, $Q_0$ 515; the I channel after interpolation, $I_{INT}$ 520; and the Q channel after interpolation, $Q_{INT}$ 525. In FIG. 5 the samples generated by the A/D conversion are represented by $x_n$. Each input sample in $I_0$ 510 and $Q_0$ 515 results in three output samples in $I_{INT}$ 520 and $Q_{INT}$ 525 respectively.

The filtering which takes place in step A50 of FIG. 4 can be accomplished with a digital filter which has a series of taps, also referred to as coefficients, which are used a multiplier on the input samples. The output of the filter is the sum of a the interpolated samples multiplied by their respective coefficients. In a preferred embodiment, 132 taps are used to form this filter, indicating that 132 interpolated samples are used to calculate an individual value for the output of the filter.

Figure 6:
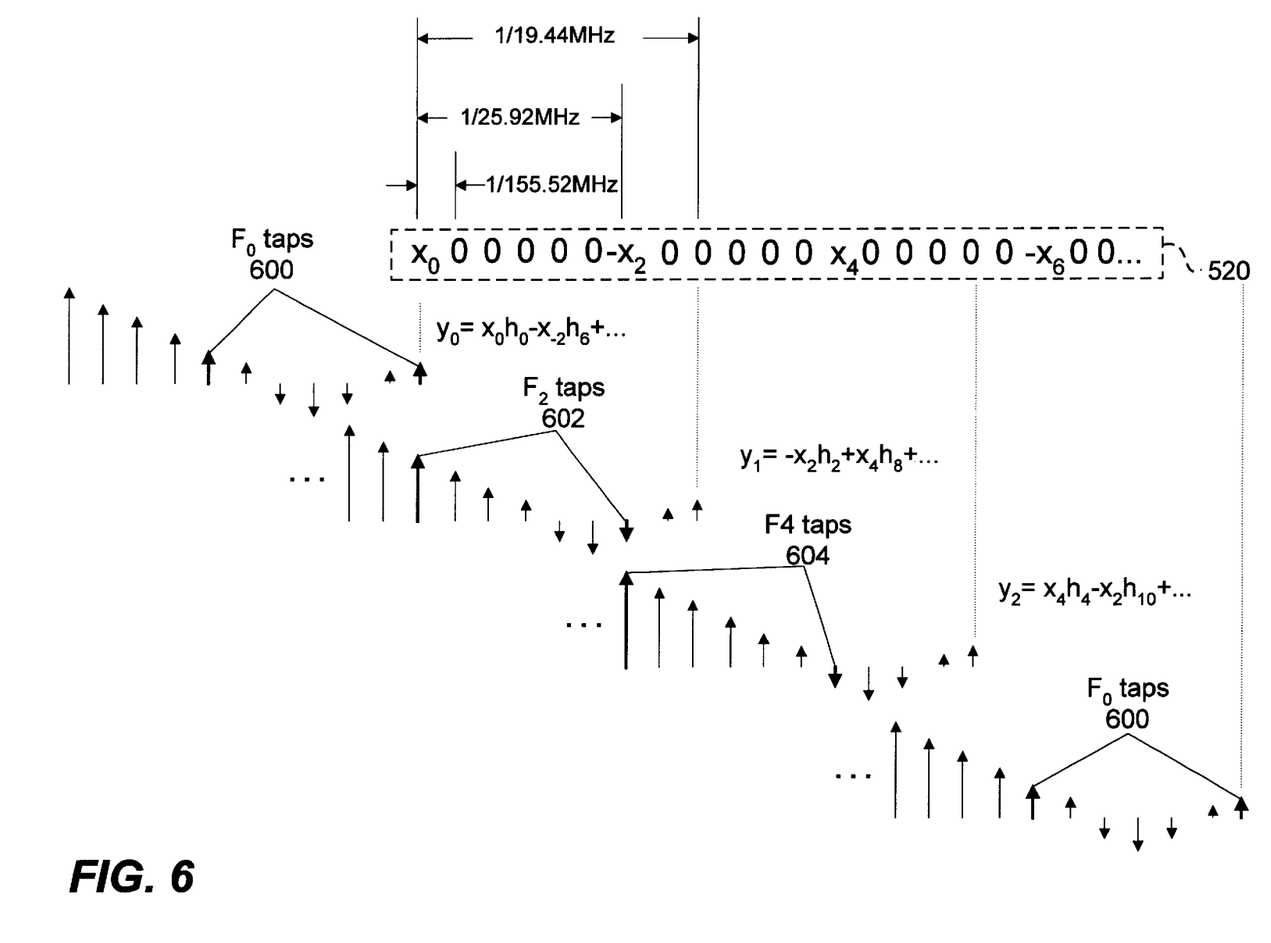
FIG. 6 illustrates the use of a polyphase filter in filtering the interpolated data stream.

FIG. 6 illustrates the use of a polyphase interpolation filter in the I channel on data $I_{INT}$ 520. A polyphase filter can be formed by grouping the taps to form a number of sub-filters within the digital filter. Use of a polyphase filter $F_0$ requires $F_0$ taps $h_0$, $h_6$, $h_{12}$, $h_{18}$ . . . , continuing on to 132 or the nearest integer below 132. Similarly, $F_2$ taps are formed from $h_2$, $h_8$, $h_{14}$, $h_{20}$ . . . , and $F_4$ taps are $h_4$, $h_{10}$, $h_{16}$, $h_{24}$. . . . The output of each polyphase filter, $y_n$, is given by the weighted sum of the taps of that filter multiplied by the respective samples $x_n$. The output values of the filters at instances $y_n$ can be seen to be $y_0=x_0h_0-x_2h_6+\ldots$, $y_1=-x_2h_2+x_4h_8+\ldots$, $y_2=x_4h_4-x_2h_{10}\ldots$, $y_3=x_8h_0-x_6h_6\ldots$.

As shown in FIG. 6, the advantage of a polyphase filter is that in forming the groups of taps, all taps which multiply zero valued data samples can be ignored, resulting in a simplified filter. All multiplies which have zero valued samples $x_n$ can be ignored in the digital realization of the filter. The final output stream of the polyphase interpolation filter in the I channel is the interpolated data at a rate of 19.44 Msps. The Q channel filtering is also performed in this manner, and the resultant downconverted samples A70 are the complex data (I and Q) at a rate of 19.44 Msps.

Polyphase filtering techniques are well understood by those skilled in the art, and are discussed in the text by R. E. Crochiere, and L. R. Rabiner; "Multirate Digital Signal Processing," (Prentice Hall, N.J., 1983) which is incorporated herein by reference.

Many of the steps shown in FIG. 4, when realized in digital logic, will be operations on samples which do not contain information (zeros) or can be realized by a simple sign change or multiplexing operation. As examples, the multiply step A30 in FIG. 4 is realized with multiplexor, and many portions of the polyphase filter 600 shown in FIG. 6 can be eliminated. Similarly, when the decimation step A60 is included in the synthesis of digital logic to perform steps A20, A40, A50 and A60, a significant number of mathematical operations can be eliminated. Methods for synthesis of digital logic to perform the steps shown in FIG. 4 are known by those skilled in the art.

In one embodiment sampling step A20 of FIG. 4 takes place in a discrete A/D integrated circuit, and the subsequent steps shown in FIG. 4 are performed in an Application Specific Integrated Circuit (ASIC) in BIU 250. In a preferred embodiment, the analog to digital conversion takes place in the ASIC.

Although the present invention has been described in considerable detail with reference to certain preferred versions thereof, other versions are possible. The goal of the invention as a method and apparatus for the synchronization and downconversion remains the same however. Therefore, the spirit and scope of the appended claims should not be limited to the description of the preferred versions contained herein.

What is claimed is:

1. In a fiber-to-the-curb telecommunications system having a broadband digital terminal connected to a broadband network unit via a telecommunications link and at least one network interface module connected to said broadband network unit via a subscriber network, a method of network synchronization comprising the steps of:
    a) generating a downstream carrier frequency at said broadband network unit which is derived from a master clock signal and is an integer multiple of a sub-harmonic of said master clock signal;
    b) generating a downstream data clock which is derived from said master clock signal and is an integer multiple of a sub-harmonic of said master clock signal;
    c) transmitting downstream data modulated onto said downstream carrier frequency at a rate which is equal to said downstream data clock;
    d) receiving said downstream data on said downstream carrier frequency at said network interface module;
    e) generating an upstream data clock at said network interface module which is derived from said master clock signal and is an integer multiple of a sub-harmonic of said master clock;
    f) generating an upstream carrier frequency which is derived from said master clock signal and is an integer multiple of a sub-harmonic of said master clock;
    g) transmitting upstream data modulated onto said upstream carrier frequency at a rate which is equal to said upstream data clock; and
    h) receiving said upstream data at said broadband network unit.

2. The method described in claim 1 wherein said master clock is phase-locked to a network clock received at said broadband digital terminal.

3. The method described in claim 1 wherein said downstream data clock is 51.84 MHz and wherein said downstream carrier frequency is 622.08 MHz.

4. The method described in claim 1 wherein said downstream data clock is 51.84 MHz and wherein said downstream carrier frequency is 19.44 MHz.

5. The method described in claim 1 wherein said upstream data clock is 19.44 MHz and wherein said upstream carrier frequency is 38.88 MHz.

6. A network interface module for use in connection with a fiber-to-the-curb telecommunications system having a network clock, said network interface module comprising:
    a) a receiver for receiving downstream data from a broadband network unit on a downstream carrier frequency, wherein said downstream carrier frequency is derived from said network clock and is an integer multiple of a subharmonic of said network clock;
    b) a first local oscillator for generating an upstream data clock, wherein said upstream data clock is derived from said network clock and is an integer multiple of a subharmonic of said network clock;
    c) a second local oscillator for generating an upstream carrier frequency, wherein said upstream carrier frequency is derived from said network clock and is an integer multiple of a subharmonic of said network clock; and
    d) a transmitter for transmitting upstream data at a rate determined by said upstream data clock to said broadband network unit wherein said upstream data is modulated onto said upstream carrier frequency.

7. The method described in claim 1 wherein said downstream carrier frequency is less than 50 MHz.

8. The network interface module described in claim 6 wherein said downstream carrier frequency is less than 50 MHz.

9. A method of synchronizing signals transmitted between a telecommunications network and a residence, said method comprising:
    deriving a downstream carrier frequency from a master clock signal, wherein the downstream carrier frequency is an integer multiple of a sub-harmonic of the master clock signal;
    deriving a downstream data clock from the master clock signal, wherein the downstream data clock is an integer multiple of a sub-harmonic of the master clock signal;
    modulating downstream data onto the downstream carrier frequency at a rate which is equal to the downstream data clock;
    deriving an upstream carrier frequency from the master clock signal, wherein the upstream carrier frequency is an integer multiple of a sub-harmonic of the master clock signal;
    deriving an upstream data clock from the master clock signal, wherein the upstream data clock is an integer multiple of a sub-harmonic of the master clock signal; and
    modulating upstream data onto the upstream carrier frequency at a rate which is equal to the upstream data clock.

\* \* \* \* \*